United States Patent [19]

van der Smissen et al.

[11] Patent Number: 4,997,803

[45] Date of Patent: Mar. 5, 1991

[54] $CO_2$ ADSORBENT MASS

[75] Inventors: Carl E. van der Smissen; Kai vom Hofe, both of Lübeck; Herbert Röhl, Reinfeld; Horst Wezurek, Ziethen, all of Fed. Rep. of Germany

[73] Assignee: Drägerwerk Aktiengesellschaft, Lubeck, Fed. Rep. of Germany

[21] Appl. No.: 448,014

[22] Filed: Dec. 7, 1989

[30] Foreign Application Priority Data

Apr. 12, 1989 [DE] Fed. Rep. of Germany ....... 3842048

[51] Int. Cl.$^5$ .................. B01J 20/04; A62B 9/00; C01B 31/20; C01F 11/02
[52] U.S. Cl. ................. 502/400; 23/313 R; 128/205.28; 252/189; 423/230; 423/640
[58] Field of Search ............... 502/400; 423/230, 640; 252/189; 23/313 R; 128/205.28

[56] References Cited

U.S. PATENT DOCUMENTS 4,116,881 9/1978 Shibata .............................. 502/400
4,233,190 11/1980 Shafer .............................. 502/400

FOREIGN PATENT DOCUMENTS 473913 10/1937 United Kingdom ............... 502/400

*Primary Examiner*—Paul E. Konopka
*Attorney, Agent, or Firm*—McGlew & Tuttle

[57] ABSTRACT

The prior-art $CO_2$ adsorbent masses used in oxygen-supplying respirators have the disadvantage that they can be granulated only very poorly. The granules have low strength and a tendency to dusting. The goal of the present invention is to produce harder granules which do not give rise to dusting any longer. This is achieved according to the present invention by adding an alkali salt of an oxo acid, preferably sodium hexametaphosphate, to the calcium hydroxide paste prior to the granulation. The present invention is not limited to this salt, but it is also possible to use alkali salts or other oxo acids, such as orthophosphoric acid, sulfuric acid, hypermanganic acid, chromic acid, and vanadic acid. This leads to a substantial increase in the strength to the calcium hydroxide granules without any reduction of their $CO_2$ binding capacity.

5 Claims, No Drawings

$CO_2$ ADSORBENT MASS

FIELD AND BACKGROUND OF THE INVENTION

Adsorbent masses for $CO_2$ have been known, which are used to bind the exhaled $CO_2$ in recirculating respirators. Such adsorbent masses are often referred to as respirator lime. Respirator lime adsorbent consists essentially of calcium hydroxide containing a certain percentage, usually 14–18% of water. To increase the reactivity, the prior-art respirator lime adsorbent usually contains a few percent sodium hydroxide or potassium hydroxide. For use in respirators, the respirator lime adsorbent must be granulated The particle size of the granules ranges from 2 mm to 8 mm, depending on the intended use. Crushed granules or shaped lime particles with a diameter of about 4 mm are used very frequently. The prior-art types of respirator lime adsorbents have generally good $CO_2$ binding properties However, if they are used in personal respirators exposed to high mechanical stresses, e.g., in an oxygen-supplying escape apparatus, they are destroyed in a short time due to the lack of strength to the point that the respirators generate much dust and their fitness for use is no longer guaranteed. The use of the prior-art types of respirator lime adsorbents in oxygen-supplying escape apparatus is therefore associated with a great risk.

Attempts to increase the strength of respirator adsorbent lime have been reported on numerous occasions, but they always led to a marked reduction of reactivity. These attempts include, for example, the use of alkali silicates as an additive to the calcium hydroxide paste. Liquid alkali silicates (water glass) cause strengthening of the structure of the calcium hydroxide granules, but they reduce its porosity and form an outer layer of greatly reduced reactivity on the lime granule. This makes it necessary to use more respirator adsorbent lime to maintain a sufficient $CO_2$ adsorption capacity, as a result of which the respirators become bulkier, heavier, and clumsier. This is highly undesirable, especially in the case of an escape apparatus.

SUMMARY AND OBJECTS OF THE INVENTION

It is an object of the present invention to provide additives which increase the strength of the granular respirator lime adsorbent without reducing the $CO_2$ binding capacity of the respirator lime adsorbent.

This goal is achieved by adding 0.5 wt.% to 15 wt % of an alkali salt of an oxo acid to the respirator lime adsorbent paste prior to the granulation.

The respirator lime adsorbent obtains particularly good properties in terms of strength and $CO_2$ binding capacity if sodium hexametaphosphate or potassium orthophosphate is used. These substances are also very inexpensive and physiologically harmless.

However, it is also possible to use, similarly successfully, alkali salts of other oxo acids, such as sulfuric acid, hypermanganic acid, chromic acid, and vanadic acid, as well as an acid alkali salt of orthophosphoric acid.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which preferred embodiments of the invention are illustrated.

DESCRIPTION OF THE PREFERRED EMBODIMENT

The present invention comprises a $CO_2$ adsorbent mass formed of a kneadable mixture of at least calcium hydroxide and water and an additive of between 0.5 wt% and 15 wt% of an alkali salt of an oxo acid. The additive to the adsorbent mass considerably increases the strength of the mass.

EXAMPLE I

One kg calcium oxide is mixed thoroughly with 2 l water containing 50 g sodium hexametaphosphate. After cooling, the highly viscous paste is charged onto a molding belt according to West German Patent Specification No. 27,15,635 and dried in an air dryer to a water content of 16%. The respirator lime adsorbent is subsequently discharged in the form of hemispheres. 600 ml of this respirator lime adsorbent meets the requirements imposed in terms of the $CO_2$ binding capacity of the adsorber of a 15-minute oxygen-supplying escape apparatus even after the apparatus had been previously subjected to a vibration test equivalent to use for 1 year as an escape apparatus.

EXAMPLE II

One kg calcium oxide is mixed thoroughly with 2 l water containing 60 g potassium orthophosphate. After cooling, the lime paste is extruded through 6-mm orifices and then dried. The strand-like respirator lime adsorbent is crushed and screened to separate the 2.5–4.0 mm fraction. It is subsequently moistened to a water content of 16%. The finished crush-granulated respirator lime adsorbent can be used in the same way as the hemispherical molded lime adsorbent described in Example 1.

While specific embodiments of the invention have been shown and described in detail to illustrate the application of the principles of the invention, it will be understood that the invention may be embodied otherwise without departing from such principles.

What is claimed is:

1. A $CO_2$ adsorbent mass comprising a kneadable mixture of calcium hydroxide and water and between 0.5 wt.% and 15 wt.% of an alkali salt of an oxo acid from the group consisting of alkaline metal hexametaphosphate and alkaline metal orthophosphate as an additive to increase the strength of the mixture.

2. A $CO_2$ adsorbent mass according to claim 1, wherein sodium hexametaphosphate is used as the alkali salt of oxo acid.

3. A $CO_2$ adsorbent mass according to claim 1, wherein potassium hexametaphosphate is used as the alkali salt of an oxo acid.

4. A $CO_2$ adsorbent mass according to claim 1, wherein sodium orthophosphate is used as the alkali salt of an oxo acid.

5. A $CO_2$ adsorbent mass according to claim 1, wherein a potassium orthophosphate is used as the alkali salt of an oxo acid.

* * * * *